(12) United States Patent
Krespach

(10) Patent No.: US 9,688,144 B2
(45) Date of Patent: Jun. 27, 2017

(54) DISPLAY DEVICE FOR A MOTOR VEHICLE AND TEST METHOD FOR A DISPLAY DEVICE OF A MOTOR VEHICLE

(71) Applicant: Robert Bosch GmbH, Stuttgart (DE)

(72) Inventor: Andreas Krespach, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 339 days.

(21) Appl. No.: 14/538,539

(22) Filed: Nov. 11, 2014

(65) Prior Publication Data

US 2015/0130602 A1 May 14, 2015

(30) Foreign Application Priority Data

Nov. 12, 2013 (DE) ................. 10 2013 222 943

(51) Int. Cl.
*B60Q 1/00* (2006.01)
*B60K 35/00* (2006.01)
*B60K 37/06* (2006.01)

(52) U.S. Cl.
CPC ............ *B60K 35/00* (2013.01); *B60K 37/06* (2013.01); *B60K 2350/1056* (2013.01)

(58) Field of Classification Search
CPC . B60K 35/00; B60K 37/06; B60K 2350/1056
USPC ............... 340/425.5, 426.1, 438, 506, 3.1
See application file for complete search history.

(56) References Cited

U.S. PATENT DOCUMENTS

| | | | | |
|---|---|---|---|---|
| 5,940,518 A * | 8/1999 | Augustyn | ............ | H04R 29/003 381/59 |
| 2005/0175195 A1* | 8/2005 | Cheney, Jr. | .......... | G01R 31/041 381/120 |
| 2012/0253821 A1* | 10/2012 | Kamiya | .................. | G10L 99/00 704/270.1 |
| 2013/0257064 A1* | 10/2013 | Quijano | ................ | E05C 19/022 292/169 |

FOREIGN PATENT DOCUMENTS

DE       198 59 430       7/2000

* cited by examiner

*Primary Examiner* — Daryl Pope
(74) *Attorney, Agent, or Firm* — Gerard Messina

(57) ABSTRACT

A display device for a motor vehicle includes: a display for displaying vehicle information; a computing device receiving vehicle data via a data bus, evaluating the received vehicle data, and causing an acoustic warning as a function of the evaluation of the vehicle data; and a connection between the display device and a loudspeaker for outputting of the acoustic warning, the connection to the loudspeaker being connected to an input of an evaluation device in such a way that, depending on a signal present at the connection of the loudspeaker, a malfunctioning or a functioning of the acoustic output is determined, and an optical warning display is provided for outputting an optical warning in the case of a malfunction of the acoustic output.

9 Claims, 5 Drawing Sheets

DISPLAY DEVICE FOR A MOTOR VEHICLE AND TEST METHOD FOR A DISPLAY DEVICE OF A MOTOR VEHICLE

BACKGROUND OF THE INVENTION

1. Field of the Invention

The present invention relates to a display device of a motor vehicle and a test method for such a display device.

2. Description of the Related Art

From published German patent application document DE 198 59 430 A1, a display device is known for a motor vehicle in which a control unit has allocated to it a storage device in which previously calculated image data are stored. The display device is provided for a dashboard in a motor vehicle, and presents information that relates to the momentary state of the vehicle or its surrounding environment, such as vehicle speed, engine rotational speed, or internal and external temperature. Via a data input, the control device receives information from which it produces instructions in order to represent image data in the display.

In addition, it is known from the prior art to output acoustic warnings to a driver of the vehicle, for example a lane departure warning or an acoustic confirmation signal for a directional display.

BRIEF SUMMARY OF THE INVENTION

The display device according to the present invention has, in contrast to the existing art, the advantage that when there is an acoustic warning indication, a driver is given an optical confirmation if the acoustic warning display has failed. This is because acoustic warnings in the vehicle are provided in particular so that the driver does not have to look at the display device in order to perceive the warning. Warnings are provided in particular when an error or a danger of particular seriousness occurs, so that a driver is also warned by the additional acoustic warning, in addition to via the optical perception path. If the corresponding acoustic warning fails, it can be that a driver will rely on an acoustic warning that may be produced, and when this warning is not present the driver may incorrectly assume that no danger exists. Due to the fact that when there is a failure of the acoustic warning the driver receives an optical warning, it is possible that in such a case the driver will pay more attention to an optical warning display in the vehicle, or that the driver will even pay more attention to the surrounding environment of the vehicle, and will not rely on the acoustic warning that may be expected. In this way, safety in the vehicle is increased. The advantages according to the present invention are achieved in particular in that, as a function of a signal present at a connection of a loudspeaker of a display device, an error function or a function of the acoustic output is determined, and that an optical warning display is provided in order to output an optical warning in case of a malfunction of the acoustic output.

The connection of an acoustic warning output to the display device is advantageous because, as a rule, in the display device an evaluation of vehicle information already takes place for an optical displaying of this information, and thus an acoustic warning can easily also be outputted. In addition, according to the present invention it can thus easily also be checked whether the acoustic warning can be outputted without error.

It is particularly advantageous to provide a coupling-out circuit that rectifies the signal present at the loudspeaker and integrates it with a capacitor. In this way, the evaluation of the loudspeaker signal is reduced to a comparison with a fixed threshold value, simplifying the evaluation.

In addition, it is advantageous to provide a storage unit for storing audio signals that are to be outputted. In this way, on the one hand the outputting of acoustic warnings can be simplified, and on the other hand a test signal can also be stored in the storage unit for carrying out a test of whether the acoustic output device is functioning correctly or not. Due to the access to a stored control signal for a test operation, the carrying out of the test can be simplified, because use can be made of a fixed, predetermined signal that can easily be called from the memory.

In addition, it is advantageous to control, using a computing device, an amplifier device to produce an output signal present at the connection of the loudspeaker. This is because via the computing device, a test of the functionality of the acoustic output can easily be carried out.

In addition, it is advantageous to divide the computing device into a first computing unit and a second computing unit. The first computing unit can easily evaluate a vehicle data bus and determine corresponding warning information. Because the acoustic output takes place via a second computing unit, an acoustic warning can for example also be outputted when there is a disturbance of a data bus connection, or a disturbance of the processing in the first computing unit. In particular, here it is advantageous that an evaluation device that tests a functionality of the acoustic output is then established in the second computing unit.

Due to the fact that the same unit that receives a request for the output of an acoustic warning signal also monitors the correct outputting of the warning and, in the case of a malfunction, generates a corresponding warning message indicating the malfunction, in order to assess the failsafeness of the acoustic warning system it is necessary to consider only this unit with regard to its hardware and software.

Corresponding advantages result for a test method according to the present invention for a display device of a motor vehicle.

Here it is particularly advantageous that in a test of the function of the acoustic output, the connection of the loudspeaker is provided with a signal that, when forwarded to the loudspeaker, causes the loudspeaker to emit an audio signal in a frequency range that is not audible to humans. In this way, a test method can be carried out without disturbing the driver of the vehicle.

In particular, in this way it is possible to emit a sufficient signal amplitude to the connection of the loudspeaker without distracting the driver with the production of a loud audible signal.

In addition, it is advantageous that in the case of a malfunction of an acoustic output at least one vehicle system is deactivated that is essentially dedicated to an acoustic confirmation. In this way, it can be avoided that a driver will rely on an activated system whose activation may additionally be displayed to the driver, the driver in this way committing a driving error because he is not acoustically warned of a danger to the vehicle.

DETAILED DESCRIPTION OF THE INVENTION

Figure 1:
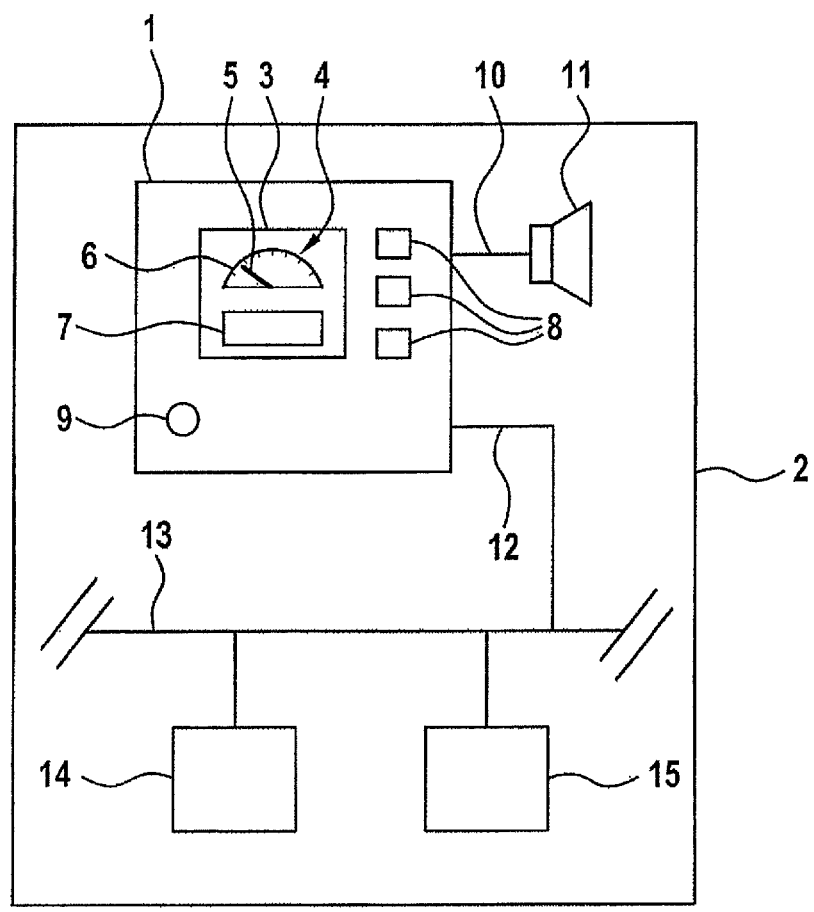
FIG. 1 shows a schematic view of a display device according to the present invention in a motor vehicle.

FIG. 1 shows an exemplary embodiment of a display device 1 according to the present invention in a motor vehicle 2. Display device 1 is in particular situated in an instrument panel of motor vehicle 2. In particular, it is situated in front of the driver of vehicle 2, in the instrument panel. In a further specific embodiment, display device 1 can also be situated in a center console of vehicle 2.

Display device 1 has a display surface 3 realized for example as a liquid crystal display. In display surface 3 there is for example provided a pointer display 4 for the representation of a measurement value using a pointer 5 along a scale 6, represented as images in display surface 3. In addition, text outputs or symbols can be displayed in display fields 7. Display surface 3 is used in particular to display vehicle information, such as vehicle speed, engine rotational speed, or vehicle parameters such as the filling state of the tank or the temperature of the coolant. In addition, display surface 3 can also contain warning information such as the distance from an obstacle, a lane departure warning, or a failure of a vehicle system. In particular, display surface 3 can also contain information concerning a directional indication, for example by displaying an arrow symbol.

In a supplementary specific embodiment, in addition warning lights 8 can be provided that are activated when there are vehicle malfunctions. An allocation of an activation of a warning light to a vehicle malfunction here takes place either through a symbol attached on the warning light or a symbol attached next to the warning light. In an optional specific embodiment, in addition an operating element 9 can be provided with which the driver can carry out inputs for controlling the display device.

In addition, display device 1 is connected to a loudspeaker 11 via a connection 10. Here, in a first specific embodiment loudspeaker 11 can be situated in a constructive unit of display device 1; for example, it can be attached on a circuit board not shown in FIG. 1 that also bears the control electronics for display device 1. In a further specific embodiment, it can also be provided in the instrument panel, adjacent to display device 1. In a further specific embodiment, display device 1 can also be connected to a radio device in motor vehicle 2, so that acoustic outputs caused by display device 1 are outputted via the car radio of motor vehicle 2.

In particular, loudspeaker 11 is activated in order to emit a warning signal when display device 1 has determined the presence of a risk to vehicle 2, or has determined a critical state of vehicle 2.

In order to determine risks to the vehicle, or vehicle states, display device 1 is connected to a vehicle data bus 13 via a data bus connection 12. Vehicle data bus 13 is preferably fashioned as a CAN bus. However, alternatively or in addition additional data buses can be provided, such as a MOST bus or a LIN bus. Via data bus 13, display device 1 is connected to control devices 14, 15 in the vehicle that control vehicle functions, or that monitor the surrounding environment of the vehicle or vehicle functions. This can for example include a brake control device, a surrounding environment monitoring control device such as a distance sensor control device, or an engine control device. The information of these control devices is transmitted via data bus 13 to display device 1, and is evaluated in display device 1. Thus, for example a distance from obstacles in the surrounding environment of the vehicle, measured via distance sensors of vehicle 2, is evaluated by vehicle control device 15 and communicated to display device 1. In display device 1, for example in text field 7 an indication is outputted of the critical distance of the vehicle. In addition, an acoustic output of a signal tone, for example a continuous or interrupted signal tone, can be outputted to the driver of the vehicle via loudspeaker 11.

Figure 2:
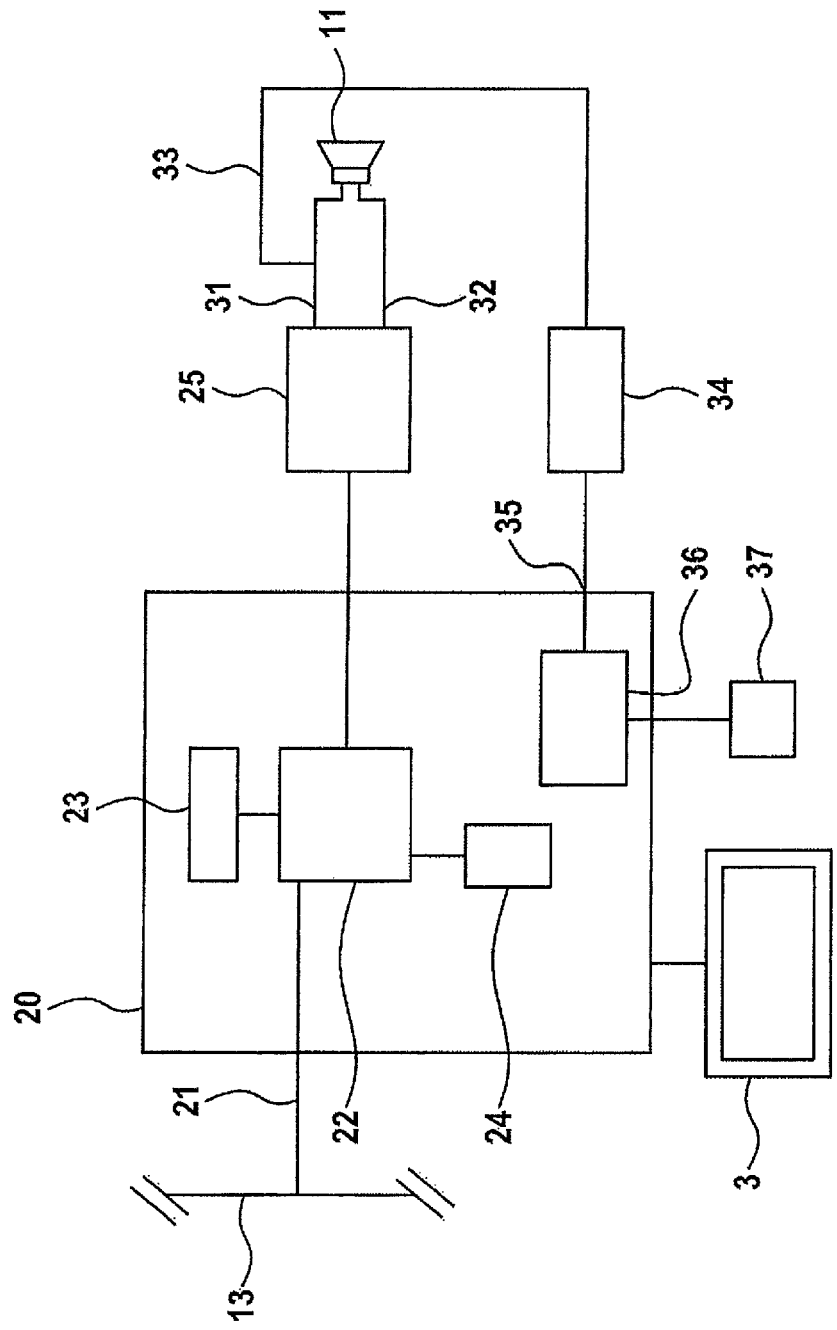
FIG. 2 shows a first exemplary embodiment of a display device according to the present invention in a motor vehicle.

FIG. 2 shows an exemplary embodiment of a display device according to the present invention. A computing device 20 of the display devices connected to data bus 13 via a data bus connection 21. Computing device 20 has an evaluation unit 22 that evaluates the vehicle data received via the vehicle data bus and compares it in each case to a reference value stored in a storage device 23. If it is determined that an item of vehicle data, for example a distance value or a vehicle temperature, has exceeded a critical value, or that a particular vehicle function has been activated, such as a directional display or a warning blinker display, then an evaluation unit 22 initiates the output of an optical item of information via display surface 3. For this purpose, preferably a graphics processor 24 is controlled that controls display surface 3.

If, alternatively or in addition, an acoustic output is provided, then an evaluation unit 22 causes the acoustic output by outputting a control command to an amplifier device 25. Amplifier device 25 produces a control signal for loudspeaker 11. By exciting loudspeaker 11, the control signal produces an output of an acoustic signal that is audible to the driver. The acoustic signal can be a warning tone, a modulated warning signal, or a speech output. Loudspeaker 11 is connected to outputs of amplifier device 25 via a first connection 31 and a second connection 32. At first connection 31, there is provided an electrical connection 33 via which an output signal is picked off that is outputted to loudspeaker 11 by amplifier device 25. The output signal is preferably routed via a coupling-out unit 34 to an input 35 of computing device 20. Computing device 20 has an evaluation device 36 that evaluates the input signal. Preferably, input 35 has an analog-digital converter, so that the input signal can be digitally evaluated by computing device 20.

Preferably, the signal is smoothed and also integrated by coupling-out unit 34. Thus, evaluation device 36 compares the integrated and smoothed signal to a specified threshold value. If the threshold value is exceeded, then an acoustic output is present and functioning of the acoustic output unit is determined. However, if at any point during the acoustic output there is an error, then no acoustic output signal is present. In this case, the threshold value is not reached. If the threshold value is not reached, then a malfunction of the acoustic output is determined. In this case, evaluation device 36 activates, in a first specific embodiment, a warning light 37 that is preferably situated in display device 1 or at some other location in the vehicle. In a further specific embodiment, alternatively or in addition an indication can also be displayed in display surface 3.

In a further specific embodiment, it is also possible that via connection 33 the alternating voltage signal that is as a rule used for the controlling of loudspeaker 11 is routed to input 35 of the evaluation device and is evaluated there. On the one hand, it is possible here to evaluate the amplitude of the signal. In addition, it is also possible, in a further specific embodiment, to compare the waveform of the picked-off electronic signal to a specified signal curve in order to check the correctness of the acoustic output with regard to the signal shape as well, and thus for example also to monitor the intelligibility of a speech output using an expected signal waveform corresponding to the speech signal.

Figure 3:
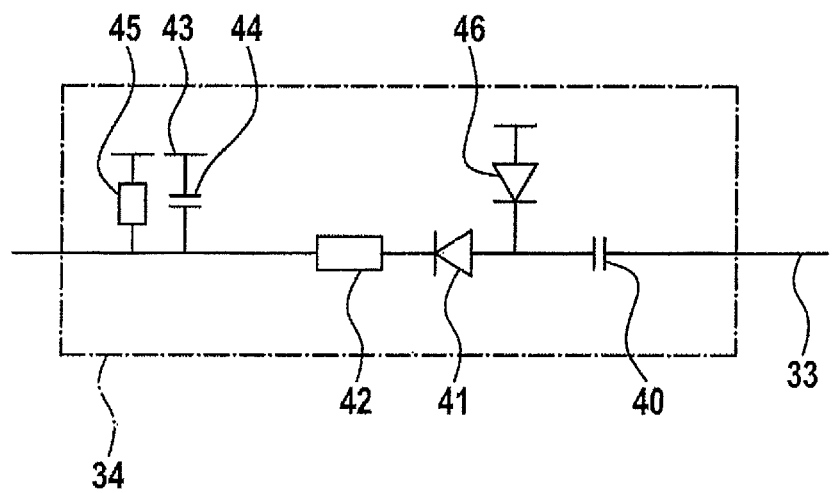
FIG. 3 shows a detail of a coupling-out circuit according to the present invention for a display device according to the present invention.
Figure 4:
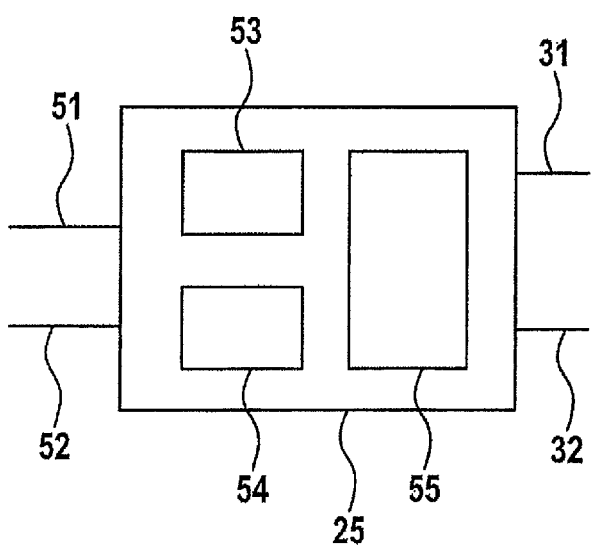
FIG. 4 shows an example of an amplifier unit for an acoustic output of a display device according to the present invention.

FIG. 3 shows an exemplary embodiment of coupling-out unit 34. The signal picked off from the connection of loudspeaker 11 and supplied via connection 33 is first routed via a coupling-out capacitor 40. Subsequently, the signal is rectified via a first diode 41. Between coupling-out capacitor 40 and first diode 41 there is connected a second diode 46 in the reverse direction relative to ground 43. Via a low-pass circuit connected to first diode 41, i.e. a resistor 42 and a capacitor 44 connected against ground 43, the signal is integrated. In addition, a further resistor 45 can also be connected against ground. Preferably, amplifier device 25 is connected to associated outputs of the computing device both via a data line 51 and via a control line 52. Data line 51 can for example be realized as an analog data line. Preferably, filter circuits can be provided between amplifier devices 25. In a preferred specific embodiment, data line 51 can also be realized as a digital data connection. For example, data connection 51 can be realized as an I$^2$S data connection.

Control line 52 is used to control the amplification, in particular the volume. Preferably, the control line is realized as an I$^2$C data line. Amplifier device 25 has a decoding unit 53 for decoding the received audio signals. In addition, the amplifier device has an evaluation device 54 for evaluating the received control signals. In addition, an amplifier circuit 55 is provided in which the audio control signals determined via decoder unit 53 are amplified in such a way that an alternating voltage can be applied to outputs 31, 32 in such a way that a loudspeaker connected thereto is controlled to output an audio signal audible in the vehicle. In a further specific embodiment, it is also possible for a digital loudspeaker to be used.

Figure 5:
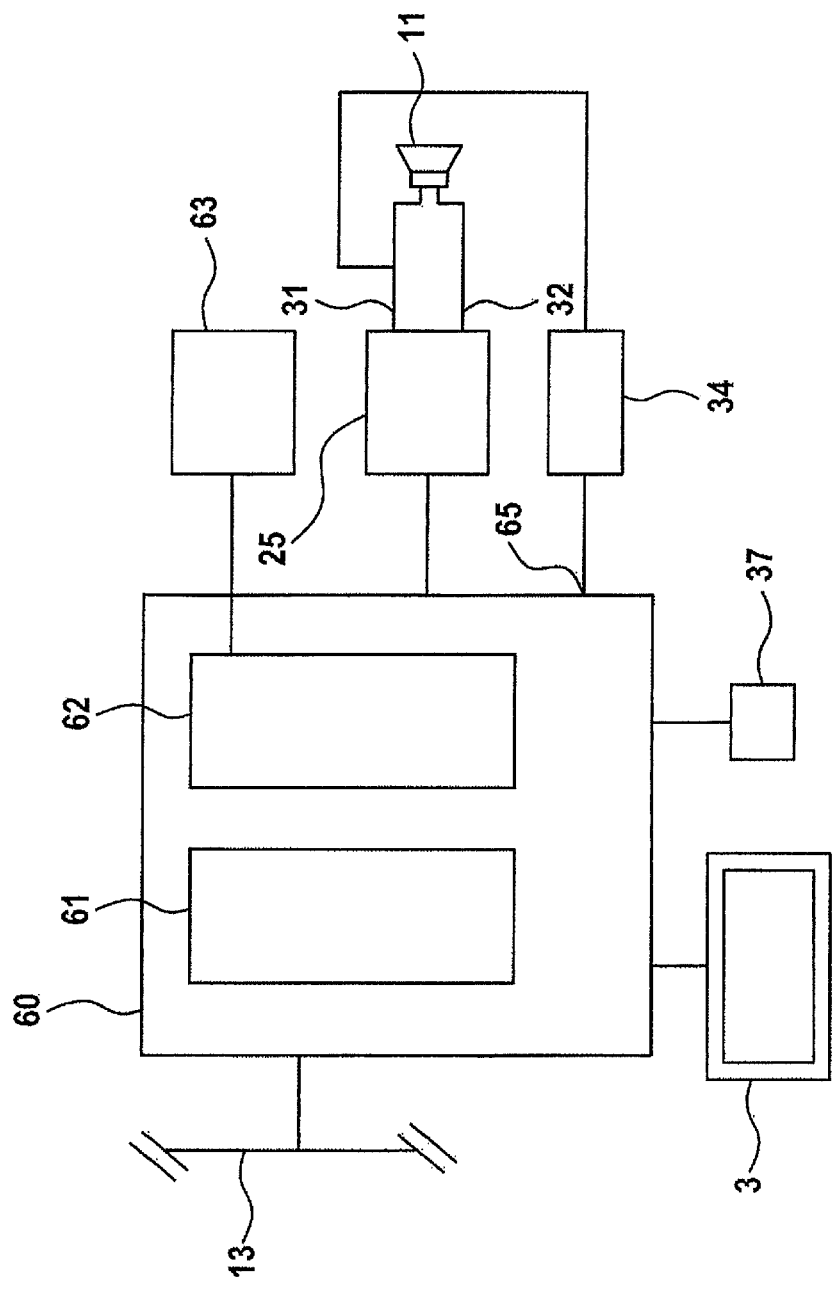
FIG. 5 shows a second exemplary embodiment of a display device according to the present invention for a motor vehicle.

FIG. 5 shows a further specific embodiment of a display device according to the present invention. A computing device 60 has a first computing unit 60 and a second computing unit 62. First computing unit 61 processes the vehicle data received from data bus 13 and evaluates these to see whether an item of warning information has to be displayed. Display surface 3 is controlled correspondingly. Second computing unit 62 is controlled by first computing unit 61. Second computing unit 62 takes over the outputting of acoustic information. For this purpose, second computing unit 62 is connected to a storage unit 63. In storage unit 63, there are stored already-calculated control signals for an acoustic output. Control unit 63 is preferably situated on a circuit board of the display device. As a function of the control commands received from first computing unit 61, second computing unit 62 reads corresponding acoustic control signals from storage unit 63 and forwards them to amplifier device 25. Amplifier device 25 controls loudspeaker 11 in a corresponding manner. A signal picked off from a connection 31 of loudspeaker 11 is forwarded via coupling-out unit 34 to an input 65 of computing device 60. Preferably, second computing unit 62 evaluates the received signal and checks whether the acoustic output unit is functioning. In a corresponding manner, when there is a malfunction an indication of the malfunction is outputted in display surface 3 or via a warning display 37.

Figure 6:
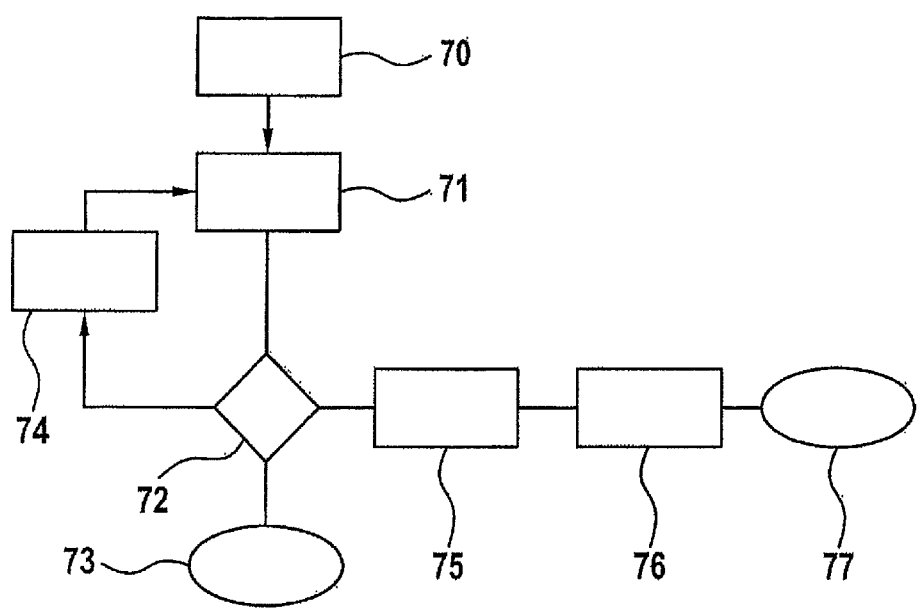
FIG. 6 shows a test method according to the present invention for a display device of a motor vehicle.

FIG. 6 shows an exemplary embodiment for a testing sequence according to the present invention. The testing sequence is introduced with an initialization step 70. A test can take place for example when an engine of the vehicle is started. In addition, it is also possible for a test to take place during travel, at specified time intervals. In addition, it is also possible to carry out a test when a particular relevant vehicle system is activated, such as a distance display. In the case of the distance display, as a rule a driver will observe the surrounding environment of the vehicle and will therefore direct his view away from a display surface. Here, he will rely in particular on the acoustic confirmation of a distance warning. Thus, when there is an activation of a distance warning display, for example when the vehicle is put into reverse, a testing of the acoustic output can also take place.

For testing, in a measurement and testing step 71 the computing device of the display device outputs a test signal via an amplifier unit to a loudspeaker of the acoustic output of the display device. In a first specific embodiment, this can be an audible signal, for example a signal tone used to warn the driver. In a further specific embodiment, the volume of this signal tone can be reduced during the functional test in comparison to the conventional output, so that the tone is barely audible, but the signal can still be effectively evaluated. In a further specific embodiment, a signal tone can be selected whose frequency is in a frequency range that is not audible, or is poorly audible, to human beings. For example, a suitable frequency in a range of from 25 kHz to 50 kHz can be selected.

In a subsequent test step 72, it can be checked whether a signal is detected by the computing device via the picking off of the signal from the connection of the loudspeaker. If this is the case, the device is functioning properly, and branching takes place to an end step 73.

If no signal, or no adequate signal, is detected, then in a specific embodiment branching can next take place to an adaptation step 74. In adaptation step 74, a counter is incremented that indicates that adaptation step 74 has already been reached. In addition, an amplitude of the signal is increased. Subsequently, measurement step 71 is repeated. If in the following test step it is determined that it is still the case that no signal can be determined, then branching takes place to an output step 75. Output step 75 can, in a different specific embodiment, also be reached directly from test step 72 without adaptation step 74.

In output step 75, an optical output is made to the driver, indicating that an acoustic warning function is not functioning correctly. This can for example take place through the activation of a warning light or, alternatively or in addition, through a text output in a display surface of display device 1. In a further optional deactivation step 76 a vehicle function can be deactivated, such as a lane departure warning. This is preferably displayed to the driver through an additional deactivation message of the driver support system, through an optical display. Subsequently, the method according to the present invention is terminated by an end step 77.

What is claimed is:
1. A device for a motor vehicle, comprising:
a processing device configured to:
 receive vehicle data via a data bus;
 evaluate the received vehicle data; and as a function of the evaluation, trigger a loudspeaker to produce an acoustic warning based on an acoustic signal provided over an acoustic signal line to an input of the loudspeaker;

an optical warning display; and a line connected to an input of the processing device and that is configured to provide to the processing device a signal obtained by picking off, via a branch from the acoustic signal line, the acoustic signal that is on the acoustic signal line and that is provided to the input of the loudspeaker, wherein the processing device is configured to:

determine a malfunction of an acoustic output of the loudspeaker based on the signal that is obtained by the picking off and that is provided to the computing device via the input of the processing device; and output an optical warning via the optical warning display to indicate the malfunction of the acoustic output of the loudspeaker.

2. A device for a motor vehicle, the device comprising:

a processing device configured to:

receive vehicle data via a data bus;

evaluate the received vehicle data;

as a function of the evaluation of the vehicle data and via a connection between the processing device and a loudspeaker, trigger the loudspeaker to output an acoustic warning, wherein the connection is connected to an input of the processing device;

a coupling-out circuit having (i) at least one diode for rectification of a signal present at the connection between the processing device and the loudspeaker, and (ii) at least one low-pass filter for integrating the signal to provide a direct voltage level at an input of the processing device, wherein the processing device is configured to determine a malfunction of the loudspeaker based on the direct voltage level provided at the input of the processing device; and an optical warning display configured o display an optical warning of the determined malfunction.

3. The device as recited in claim 2, further comprising:

a data storage unit for storing audio signals, wherein at least one stored audio signal is called by the processing device and processed for outputting to the loudspeaker.

4. The device as recited in claim 2, further comprising:

an amplifier device, wherein the connection between the processing device and the loudspeaker is via the amplifier device, and the amplifier device is configured to produce the signal present at the connection, the amplifier device being controlled by the processing device via a data bus.

5. The device as recited in claim 4, wherein:

the processing device has a first computing unit and a second computing unit;

the first computing unit has at least one interface to a vehicle data bus, the at least one interface evaluating received vehicle data and, as a function of the evaluation, initiating an audio output through the second computing unit; and the second computing unit, as a function of the initiation of the audio output, causes the amplifier device to output a specified audio signal to the loudspeaker.

6. The device as recited in claim 5, wherein the optical warning display is controlled by the second computing unit.

7. A method for generating a warning in a motor vehicle having a device including (i) an optical warning device, and (ii) a processing device, the method comprising:

receiving, by the processing device, vehicle data via a data bus;

evaluating, by the processing device, the received data;

as a function of the evaluation, the processing device triggering a loudspeaker to produce an acoustic warning based on an acoustic signal provided over an acoustic signal line to an input of the loudspeaker;

receiving, by the processing device and via a line connected to an input of the processing device, a signal obtained by picking off, via a branch from the acoustic signal line, the acoustic signal that is on the acoustic signal line and that is provided to the input of the loudspeaker;

determining, by the processing device, a malfunction of an acoustic output of the loudspeaker based on the signal that is obtained by the picking off and that is provided to the processing device via the input of the processing device; and outputting, by an optical warning device, an optical warning to indicate the malfunction of the acoustic output of the loudspeaker.

8. A method for generating a warning in a motor vehicle having a device, the device including (i) an optical warning device and (ii) a processing device, the method comprising:

receiving, by the processing device, vehicle data via a data bus;

evaluating, by the processing device, the received data;

the processing device causing an acoustic warning as a function of the evaluation of the vehicle data, wherein the acoustic warning is produced by controlling a loudspeaker via a connection to the loudspeaker;

determining, by an evaluation device, a malfunction of an acoustic output of the loudspeaker as a function of a signal present at the connection; and outputting, by an optical warning device, an optical warning of the determined malfunction, wherein in a test operation:

a control signal is applied at the connection to the loudspeaker; and the control signal corresponds to an audio signal in a frequency range not audible to human beings.

9. The method as recited in claim 8, further comprising:

deactivating at least one vehicle system if a malfunction of the acoustic output of the loudspeaker is determined.

* * * * *